April 17, 1956     F. G. BACK     2,741,947
VARIFOCAL OBJECTIVES WITH OPTICAL
IMAGE SHIFT COMPENSATION
Filed July 16, 1954

FIG. 1
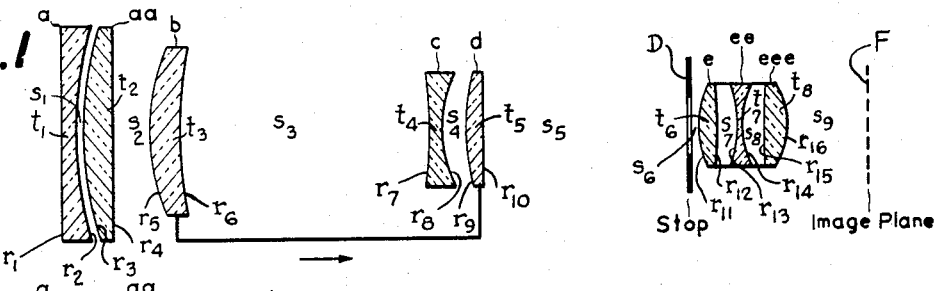

FIG. 2
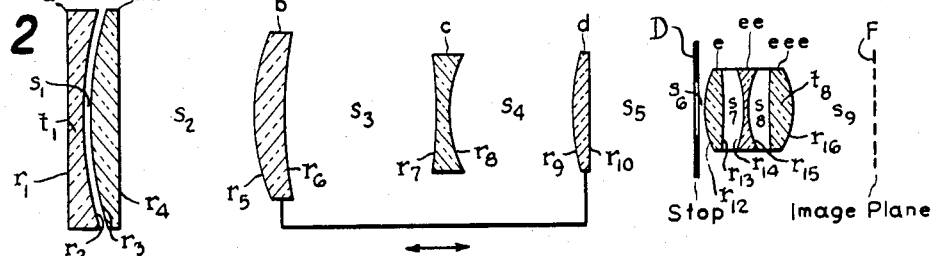

FIG. 3
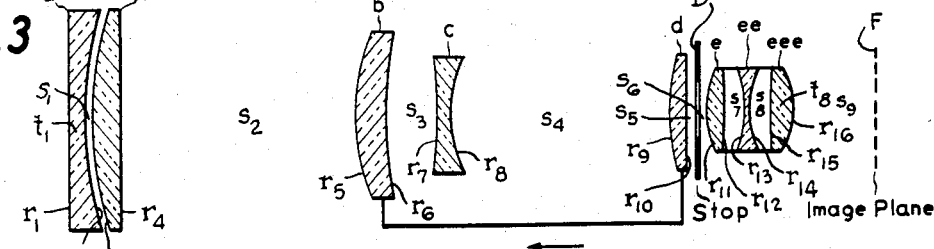

FIG. 4

| | GLASS | POWER |
|---|---|---|
| Dispersing Lens (a) | high refracting, high dispersing flint | at least $\frac{1}{2} \times$ and at most $\frac{3}{4} \times \phi$ |
| Collecting Lens (aa) | high refracting, low dispersing dense crown | at least $\frac{1}{2} \times$ and at most $\frac{3}{4} \times \phi$ |
| Collecting Lens (b) | high refracting, low dispersing dense crown | at least $\frac{5}{8} \times$ and at most $\frac{7}{8} \times \phi$ |
| Dispersing Lens (c) | high refracting barium flint of medium dispersion | at least $2 \times$ and at most $2\frac{1}{2} \times \phi$ |
| Collecting Lens (d) | high refracting, low dispersing dense crown | at least $1\frac{1}{2} \times$ and at most $2 \times \phi$ |
| Stop | | |
| Collecting Lens (e) | high refracting, low dispersing dense crown | at least $2\frac{1}{2} \times$ and at most $3 \times \phi$ |
| Dispersing Lens (ee) | high refracting, high dispersing flint | at least $5 \times$ and at most $5\frac{1}{2} \times \phi$ |
| Collecting Lens (eee) | high refracting, low dispersing dense crown | at least $3 \times$ and at most $3\frac{1}{2} \times \phi$ |

$\phi$ = absolute minimum power of the objective

United States Patent Office 2,741,947
Patented Apr. 17, 1956

2,741,947

VARIFOCAL OBJECTIVES WITH OPTICAL IMAGE SHIFT COMPENSATION

Frank G. Back, Glen Cove, N. Y.

Application July 16, 1954, Serial No. 443,764

Claims priority, application Germany February 18, 1954

4 Claims. (Cl. 88—57)

The present invention relates to varifocal objectives which are provided with optical image shift compensation.

This application corresponds to the copending German application B 29,777 IXa/42h of February 18, 1954 and is a continuation in part of U. S. Patent application Serial Number 315,088 now U. S. Patent 2,718,817 issued September 27, 1955.

Such objectives have heretofore been described in the German Patent 815,110 and the United States Patent 2,566,485.

The disadvantages of the known and conventional objectives of this type reside in the fact that it is not possible to comply with the requirements of the sine condition over the entire focal range and these devices cannot be corrected for coma and lateral color over the entire focal range.

The object of the present invention is a new, novel and suitable optical design for varifocal objectives by means of which the disadvantages inherent in the conventional lens systems of this type, are effectively eliminated.

To permit an adequate description of the present invention, a preferred form thereof is schematically illustrated in the drawings, without limiting the scope of the invention to this example.

In the drawings, a preferred example is schematically shown in three views, in which:

Fig. 1 is a sectional view in side elevation illustrating a varifocal objective, constructed in accordance with the present invention, in which the movable lens components are shown in a forward position;

Fig. 2 is a view identical to Fig. 1, but the movable lens components are shown in an intermediate position;

Fig. 3 is identical to the views illustrated in Figs. 1 and 2, but showing the movable lens components in a rearward position; and Fig. 4 is a table of values indicating the powers of the respective varifocal objective lenses illustrated and shown in Figs. 1, 2 and 3.

In all the drawings it is clearly shown that the construction of an objective in accordance with the present invention consists of a plurality of fixed lens components, as hereinafter specified in detail, in combination with two movable lens components. The movable lens components are relatively fixedly interconnected with each other.

While in the preferred form of the present invention, which is illustrated in the drawings, an odd number of fixed lens components, namely three, have been employed, it is understood that an even number of fixed lens components can also be employed to accomplish the purposes of the present invention. More particularly, it has been determined by experiments, that the use of an odd number of fixed lens components is particularly suitable for objectives to be employed for cinematographic purposes. While on the other hand, for other uses, as for instance in television, objectives provided with an even number of fixed lens components, two or four, have been found to be most suitable.

The disadvantages of the hereinabove mentioned conventional objectives are overcome in accordance with the present invention by introducing a fixed lens combination consisting of a dispersing element $a$ and a collecting element $aa$. This lens combination is over corrected for chromatic aberration, coma and astigmatism. Furthermore, it contributes effectively to the fulfillment of the sine condition.

The lenses $a$ and $aa$ can be moved with respect to each other so as to permit focusing of the objective without affecting the image shift compensation inherent in the construction of the present invention. The construction in accordance with the present invention requires, furthermore that the rearmost fixed lens group $e$, $ee$ and $eee$ be over-corrected for chromatic aberration, coma and astigmatism. Furthermore, in accordance with the present invention, the stop B must be positioned in front of the rearmost fixed lens group consisting of lens elements $e$, $ee$ and $eee$. This position of the stop B provides the best possible correction for transversal aberrations. By positioning the stop B in front of the rearmost fixed lens group $e$, $ee$ and $eee$, the entrance pupil and the exit pupil of the objective are shifted forward so that the clear diameter of the forward lens elements can be kept small.

In order to specify an objective constructed in accordance with the present invention, the characteristics and relationship of lenses that constitute one preferred form of the invention are set forth in the table here below:

| Element | Radii in mm. | Thickness Separation in mm. | $N_D$ | V | Glass |
|---|---|---|---|---|---|
| $a$ | $r_1 = \infty$ | $t_1 = 4.00$ | 1.617 | 36.6 | DF |
|  | $r_2 = +76.00$ | $s_1 =$ from 1.87 to 10.00 |  |  |  |
| $aa$ | $r_3 = +76.67$ | $t_2 = 6.00$ | 1.613 | 58.8 | DBC |
|  | $r_4 = \infty$ | $s_2 =$ from 3.05 to 33.05 |  |  |  |
| $b$ | $r_5 = +56.70$ | $t_3 = 6.50$ | 1.613 | 58.8 | DBC |
|  | $r_6 = +262.00$ | $s_3 =$ from 38.92 to 8.92 |  |  |  |
| $c$ | $r_7 = -124.70$ | $t_4 = 2.80$ | 1.613 | 37.0 | DF |
|  | $r_8 = +24.75$ | $s_4 =$ from 4.82 to 34.82 |  |  |  |
| $d$ | $r_9 = +27.07$ | $t_5 = 3.10$ | 1.613 | 58.8 | DBC |
|  | $r_{10} = \infty$ | $s_5 =$ from 31.50 to 1.50 |  |  |  |
|  |  | $s_6 = 11.62$ |  |  | Diaphragm |
| $e$ | $r_{11} = +17.32$ | $t_6 = 2.50$ | 1.613 | 58.8 | DBC |
|  | $r_{12} = -172.00$ | $s_7 = 2.92$ |  |  |  |
| $ee$ | $r_{13} = -18.17$ | $t_7 = 0.75$ | 1.620 | 36.3 | DF |
|  | $r_{14} = +18.17$ | $s_8 = 2.92$ |  |  |  |
| $eee$ | $r_{15} = +195.85$ | $t_8 = 4.00$ | 1.613 | 58.8 | DBC |
|  | $r_{16} = -15.43$ | $s_9 = 23.70$ (to focal plane) |  |  |  |

Wherein $r$ indicates the radius of a spherical surface on the face of the lens elements, positive and negative radii indicating surfaces that are convex forwardly and rearwardly respectively; $t$ indicates the thickness of the lens; $s$ indicates the air gaps between successive lenses measured on the axis of the lens system; $N_D$ indicates the index of refraction of the optical glass of the lens; V denotes the dispersion factor of the optical glass of the lens; and wherein DF denotes dense flint glass; and DBC denoted dense barium crown glass. In order to specify maximum and minimum values for the lenses employed in objectives constructed in accordance with the present invention, the power of each lens is recited with values which constitute a reference to the absolute minimum power of the objective. Thus the powers $\phi$ of the individual lenses are:

Lens $a$ at least $\frac{1}{2} \times \phi$; at most $\frac{3}{4} \times \phi$
Lens $aa$ at least $\frac{1}{2} \times \phi$; at most $\frac{3}{4} \times \phi$
Lens $b$ at least $\frac{5}{8} \times \phi$; at most $\frac{7}{8} \times \phi$
Lens $c$ at least $2 \times \phi$; at most $2\frac{1}{2} \times \phi$
Lens $d$ at least $1\frac{1}{2} \times \phi$; at most $2 \times \phi$
Lens $e$ at least $2\frac{1}{2} \times \phi$; at most $3 \times \phi$
Lens $ee$ at least $5 \times \phi$; at most $5\frac{1}{2} \times \phi$
Lens $eee$ at least $3 \times \phi$; at most $3\frac{1}{2} \times \phi$ Wherein all collecting lenses $aa$, $b$, $d$, $e$ and $eee$ are made from a high refracting, low dispersing, dense crown glass. The two dispersing lenses $a$ and $ee$ are made from a high, refracting and high dispersing flint and the dispersing lens $c$ is made of a high reflecting barium flint of medium dispersion.

I claim:
1. In a varifocal objective, comprising three axially spaced aligned and disposed fixed elements and two movable elements, fixedly interconnected with each other, and disposed in the spaces between said first named fixed elements, the first and last lens of the fixed elements being each overcorrected respectively for chromatic aberration and astigmatism, each of said lenses constituting the objective having the following power relative to the absolute minimum power $\phi$ of the said objective:

Lens $a$ at least $\frac{1}{2} \times \phi$; at most $\frac{3}{4} \times \phi$
Lens $b$ at least $\frac{5}{8} \times \phi$; at most $\frac{7}{8} \times \phi$
Lens $c$ at least $2 \times \phi$; at most $2\frac{1}{2} \times \phi$
Lens $d$ at least $1\frac{1}{2} \times \phi$; at most $2 \times \phi$
Lens $e$ at least $2\frac{1}{2} \times \phi$; at most $3 \times \phi$
Lens $aa$ at least $\frac{1}{2} \times \phi$; at most $\frac{3}{4} \times \phi$
Lens $ee$ at least $5 \times \phi$; at most $5\frac{1}{2} \times \phi$
Lens $eee$ at least $3 \times \phi$; at most $3\frac{1}{2} \times \phi$ and wherein the stop of the system is positioned behind the last movable and in front of the last fixed lens element, the movable lenses $b$ and $d$ being each collecting lenses and the fixed lenses $aa$, $e$ and $eee$ being likewise each collecting lenses and the fixed lenses $a$, $c$ and $ee$ each being dispersing lenses.

2. A varifocal objective constructed in accordance with the present invention comprising the lens elements as set forth in the following table:

| Element | Radii in mm. | Thickness Separation in mm. | $N_D$ | V | Glass |
|---|---|---|---|---|---|
| $a$ | $r_1 = \infty$ | $t_1 = 4.00$ | 1.617 | 36.6 | DF |
|  | $r_2 = +76.00$ | $s_1 =$ from 1.87 to 10.00 |  |  |  |
| $aa$ | $r_3 = +76.67$ | $t_2 = 6.00$ | 1.613 | 58.8 | DBC |
|  | $r_4 = \infty$ | $s_2 =$ from 3.05 to 33.05 |  |  |  |
| $b$ | $r_5 = +56.70$ | $t_3 = 6.50$ | 1.613 | 58.8 | DBC |
|  | $r_6 = +262.00$ | $s_3 =$ from 38.92 to 8.92 |  |  |  |
| $c$ | $r_7 = -124.70$ | $t_4 = 2.80$ | 1.613 | 37.0 | DF |
|  | $r_8 = +24.75$ | $s_4 =$ from 4.82 to 34.82 |  |  |  |
| $d$ | $r_9 = +27.07$ | $t_5 = 3.10$ | 1.613 | 58.8 | DBC |
|  | $r_{10} = \infty$ | $s_5 =$ from 31.50 to 1.50 |  |  | Diaphragm |
|  |  | $s_6 = 11.62$ |  |  |  |
| $e$ | $r_{11} = +17.32$ | $t_6 = 2.50$ | 1.613 | 58.8 | DBC |
|  | $r_{12} = -172.00$ | $s_7 = 2.92$ |  |  |  |
| $ee$ | $r_{13} = -18.17$ | $t_7 = 0.75$ | 1.620 | 36.3 | DF |
|  | $r_{14} = +18.17$ | $s_8 = 2.92$ |  |  |  |
| $eee$ | $r_{15} = +195.85$ | $t_8 = 4.00$ | 1.613 | 58.8 | DBC |
|  | $r_{16} = -15.43$ | $s_9 = 23.70$ (to focal plane) |  |  |  | wherein $r$ indicates the radius on the face of the lens elements, positive and negative radii indicating surfaces that are convex forwardly and rearwardly respectively; $t$ indicates the thickness of lens; $s$ indicates the air gap between successive lenses measured on the axis of the lens system; $N_D$ indicates the index of refraction of the optical glass of the lens; V denotes the dispersion factor of the optical glass of the lens and wherein DF denotes dense flint glass; DBC denotes dense barium crown glass.

3. In varifocal objectives in accordance with claim 1, a front lens assembly comprising two substantially fixed lens elements adapted to constitute the first and fixed lens component of said objective, said lens elements movable relative to each other permitting the close up focusing of said varifocal objectives.

4. In varifocal objectives in accordance with claim 1, an arrangement providing for overcorrection for chromatic aberration, coma and astigmatism, respectively of a fixed lens group positioned in front of and positioned behind the stop of the objective adapted to adequately correct the said objective for all focal lengths.

UNITED STATES PATENTS

References Cited in the file of this patent

| | | |
|---|---|---|
| 2,165,341 | Capstaff | July 11, 1939 |
| 2,235,364 | Gramatzki | Mar. 18, 1941 |
| 2,353,565 | Kaprelian | July 11, 1944 |
| 2,454,686 | Back | Nov. 23, 1948 |
| 2,566,485 | Cuvillier | Sept. 4, 1951 |
| 2,663,223 | Hopkins | Dec. 22, 1953 |

FOREIGN PATENTS

| | | |
|---|---|---|
| 1,060,514 | France | Nov. 18, 1953 |